(12) United States Patent
Varutti et al.

(10) Patent No.: US 11,937,608 B2
(45) Date of Patent: Mar. 26, 2024

(54) PROCESS FOR PREPARING A SOFT CHEESECAKE MIXTURE AND ITS PRODUCTION PLANT

(71) Applicant: TT ITALY S.p.A., Codroipo (IT)

(72) Inventors: Nicola Varutti, Coseano (IT); Elvis Turcato, Varmo (IT)

(73) Assignee: TT ITALY S.P.A., Codroipo (IT)

( * ) Notice: Subject to any disclaimer, the term of this patent is extended or adjusted under 35 U.S.C. 154(b) by 0 days.

(21) Appl. No.: 17/558,173

(22) Filed: Dec. 21, 2021

(65) Prior Publication Data

US 2022/0192206 A1 Jun. 23, 2022

(30) Foreign Application Priority Data

Dec. 22, 2020 (IT) .......................... 102020000031928

(51) Int. Cl.
*A21D 10/04* (2006.01)
*A21C 1/00* (2006.01)
(Continued)

(52) U.S. Cl.
CPC .............. *A21D 10/04* (2013.01); *A21C 1/003* (2013.01); *A21C 1/006* (2013.01); *A21C 1/06* (2013.01);
(Continued)

(58) Field of Classification Search
CPC ...... A21D 10/04; A21C 1/006; A23C 19/0912
See application file for complete search history.

(56) References Cited

U.S. PATENT DOCUMENTS 4,022,917 A      5/1977   Selenke
4,049,244 A  *   9/1977   Hedrich .................... B29B 7/82
                                                     366/244
(Continued)

FOREIGN PATENT DOCUMENTS

DE          29709060 U1      7/1997
JP          3054298 B2  *    6/2000
(Continued)

OTHER PUBLICATIONS

FoodCrumbles, How to Choose Between Batch vs Continuous Production of Food [Online], published Mar. 20, 2017, [retrieved on 2023-085-25]. Retrieved from the Internet: <URL: https://foodcrumbles.com/batch-vs-continuous-scaling-up-a-food-production-process/> (Year: 2017).*

(Continued)

*Primary Examiner* — Changqing Li
(74) *Attorney, Agent, or Firm* — Seyfarth Shaw LLP

(57) ABSTRACT

A process for preparing a soft cheesecake mixture places the ingredients for preparing the soft mixture in a pre-mixing member. The process also includes pre-mixing the ingredients so as to blend them together to obtain a pre-mixed mixture having a density between 0.72 g/mL and 0.84 g/mL; transferring the pre-mixed mixture into a collection tank whose temperature is maintained between 25 ° C. and 40 ° C.; continuously transferring a part of the pre-mixed mixture in the collection tank towards a homogenising member; and homogenising the pre-mixed mixture by the homogenising member, whose temperature is maintained between 25° C. and 40° C. so as to obtain an emulsified mixture having a density between 0.81 g/mL and 0.92 g/mL.

9 Claims, 3 Drawing Sheets

(51) Int. Cl.
*A21C 1/06* (2006.01)
*A21C 1/14* (2006.01)
*A23C 19/09* (2006.01)

(52) U.S. Cl.
CPC ........ *A21C 1/1495* (2013.01); *A23C 19/0912* (2013.01)

(56) References Cited

U.S. PATENT DOCUMENTS

| | | | | |
|---|---|---|---|---|
| 5,006,354 | A | * | 4/1991 | Rahrooh .................... A23L 2/76 426/599 |
| 2004/0067294 | A1 | * | 4/2004 | Pedrick ................ A21D 10/045 426/549 |
| 2007/0014894 | A1 | | 1/2007 | Viaud |
| 2016/0366894 | A1 | * | 12/2016 | Haas .................... A21C 1/1415 |

FOREIGN PATENT DOCUMENTS

| | | | | |
|---|---|---|---|---|
| WO | WO-2005067722 | A1 | * 7/2005 | ............. A21D 13/24 |
| WO | 2015128176 | A2 | 9/2015 | |

OTHER PUBLICATIONS

European Patent Office; European Search Report for EP Application No. EP 21214418, dated Apr. 25, 2022, 3 pages.

* cited by examiner

PROCESS FOR PREPARING A SOFT CHEESECAKE MIXTURE AND ITS PRODUCTION PLANT

CROSS-REFERENCE TO RELATED PATENT APPLICATION

The present application claims priority to Italy Patent Application No. 102020000031928, filed on Dec. 22, 2020, the disclosure of which is expressly incorporated by reference in its entirety.

TECHNICAL FIELD

The present invention relates to a process for preparing a soft cheesecake mixture.

In particular, the invention relates to a process for optimising the preparation of the soft cheesecake mixture, which usually comprises at least some of the following ingredients: cream cheese, cream, skimmed milk powder, eggs, vanilla, sugar, flour and any food additives.

The invention also relates to a production plant able to apply the aforesaid preparation process.

PRIOR ART

Mainly in Anglo-Saxon countries, cheesecake is the typical sweet eaten at festive occasions and in daily life.

Cheesecake is a sweet comprising a biscuit base on which a tall layer of fresh cream cheese with added sugar and other ingredients rests. Document JP3054298 describes a possible process for making a mixture for cheesecakes. In particular, the aforesaid document describes a process that provides an already portioned food product for obtaining the optimisation of the transport thereof and, furthermore, which is easy to eat.

The production of the soft cheesecake mixture envisages the use of a "batch" type process which exploits planetary mixers able to mix and dissolve all the ingredients required by the recipe and, therefore, create a stable emulsion substantially free from air bubbles. Such homogenising process using a planetary mixer requires relatively long times, generally about 30 minutes, as the mixing must take place at reduced speed in order to prevent the mixture from being able to incorporate non-uniform air bubbles. The air bubbles, as well as constituting a visual defect at the time of presenting the sweet, also have a negative effect on the final taste. In fact, during the baking of the sweet, the adjacent portions to the air bubbles give a bitter after-taste to the finished product.

The use of a "batch" type process also implies long production times as the preparation of the mixture takes place in batches, substantially coinciding with the containment volume of the planetary mixer used for mixing, and also due to the need to perform numerous cleaning processes on the instrumentation because of performing the mixing in an uncontrolled environment communicating with the external environment in which there may be possible contaminating elements.

The present invention intends to offer a process for preparing cheesecakes, or at least the soft mixture required for producing such cakes, that is alternative to the one known in the state of the art and able to overcome some operating drawbacks of the latter.

SUMMARY

In this context, the technical task underlying the present invention is to provide a process for preparing a soft cheesecake mixture and its production plant which overcome the drawbacks of the above-mentioned prior art.

In particular, an object of the present invention is that of providing a process for preparing a soft cheesecake mixture able to reduce the production times with respect to those of "batch" type processes known in the state of the art.

Another object of the present invention is that of providing a process for preparing a soft cheesecake mixture able to produce a mixture having a comparable density, preferably greater, than the values known in the state of the art.

A further object of the present invention is that of providing a plant for producing a soft cheesecake mixture that requires a lower number of cleaning and maintenance operations and, furthermore, which defines reduced dimensions with respect to known systems for "batch" type production.

The stated technical task and specified objects are substantially reached by a process for preparing a soft cheesecake mixture and its production plant, which comprise the technical features disclosed in the independent claims. The dependent claims correspond to further advantageous aspects of the invention.

It should be highlighted that this summary introduces, in simplified form, a selection of concepts which will be further elaborated in the detailed description given below.

The invention relates to a process for preparing a soft cheesecake mixture comprising the following steps:

placing the ingredients for preparing the soft mixture in a pre-mixing member;

carrying out a step of pre-mixing the aforesaid ingredients so as to blend them together to obtain a pre-mixed mixture having a density comprised between 0.72 g/mL and 0.84 g/mL;

transferring the pre-mixed mixture into a collection tank whose temperature is maintained at a value comprised between 25° C. and 40° C., preferably between 27° C. and 32° C., for correctly plasticising the mixture, in particular the fats contained in the cream cheese, and therefore improving the processing thereof;

continuously transferring a part of the pre-mixed mixture present in the collection tank towards a homogenising member;

carrying out a step of homogenising the pre-mixed mixture by means of the homogenising member wherein the temperature is maintained at a value comprised between 25° C. and 40° C., preferably between 27° C. and 32° C., so as to obtain an emulsified mixture having a density comprised between 0.81 g/mL and 0.92 g/mL. Preferably, the homogenising member comprises an outer casing that surrounds a mixing chamber which extends along a longitudinal axis and which comprises at least one processing portion, a rotor arranged inside the processing portion of the mixing chamber and a stator solidly constrained to the outer casing. In particular, the stator has an annular shape around the longitudinal axis and encircles the rotor in a radially external position thereto at least at the processing portion of the mixing chamber.

The invention, further, also relates to a plant for the production of a soft cheesecake mixture.

In particular, the production plant comprises a pre-mixing member having a containment volume for containing the ingredients used to prepare the soft mixture whose temperature is maintained at a value comprised between 25° C. and 40° C., preferably between 32° C. and 37° C. Furthermore, the pre-mixing member is configured to pre-mix the aforesaid ingredients so as to obtain a pre-mixed mixture.

The production plant also comprises a collection tank having a collection volume for receiving the pre-mixed mixture and whose temperature is maintained at a value comprised between 25° C. and 40° C., preferably between 27° C. and 32° C. In particular, the collection tank is arranged downstream of the pre-mixing member.

Preferably, a mixing pump is interposed between the pre-mixing member and the collection tank and, furthermore, is configured to transfer the pre-mixed mixture from the containment volume to the collection volume.

Additionally, the plant comprises a homogenising member arranged downstream of the collection tank whose temperature is maintained at a value comprised between 25° C. and 40° C., preferably between 27° C. and 32° C., and is configured to emulsify the pre-mixed mixture until a density value comprised between 0.81 g/mL and 0.92 g/mL. In particular, the homogenising member comprises an outer casing that surrounds a mixing chamber which extends along a longitudinal axis and which comprises at least one processing portion, a rotor arranged inside the processing portion of the mixing chamber and a stator solidly constrained to the outer casing. In particular, the stator has an annular shape around the longitudinal axis and encircles the rotor in a radially external position thereto at least at the processing portion of the mixing chamber.

The process and the plant described are, therefore, advantageously able to offer continuous production of soft cheesecake mixture and, furthermore, the preparation of an emulsified mixture correctly and stably, wherein the presence of air is reduced with respect to the prior art.

Additionally, with the same amounts produced by the prior art, the process and plant described enable the production times to be reduced and fewer cleaning, sanitising and maintenance interventions to be required.

BRIEF DESCRIPTION OF THE DRAWINGS

Further characteristics and advantages of the present invention will more fully emerge from the non-limiting description of a preferred but not exclusive embodiment of a process for preparing a soft cheesecake mixture and its production plant, as illustrated in the accompanying drawings, in which.

With reference to the drawings, they serve solely to illustrate embodiments of the invention with the aim of better clarifying, in combination with the description, the inventive principles on which the invention is based.

DETAILED DESCRIPTION OF AT LEAST ONE EMBODIMENT

The present invention relates to a process for preparing a soft cheesecake mixture and its production plant.

With reference to the figures, a plant for the production of a soft cheesecake mixture has been generically indicated with the number 1.

Any modifications or variants which, in the light of the description, are evident to the person skilled in the art, must be considered to fall within the scope of protection established by the present invention, according to considerations of technical equivalence.

Figure 1:
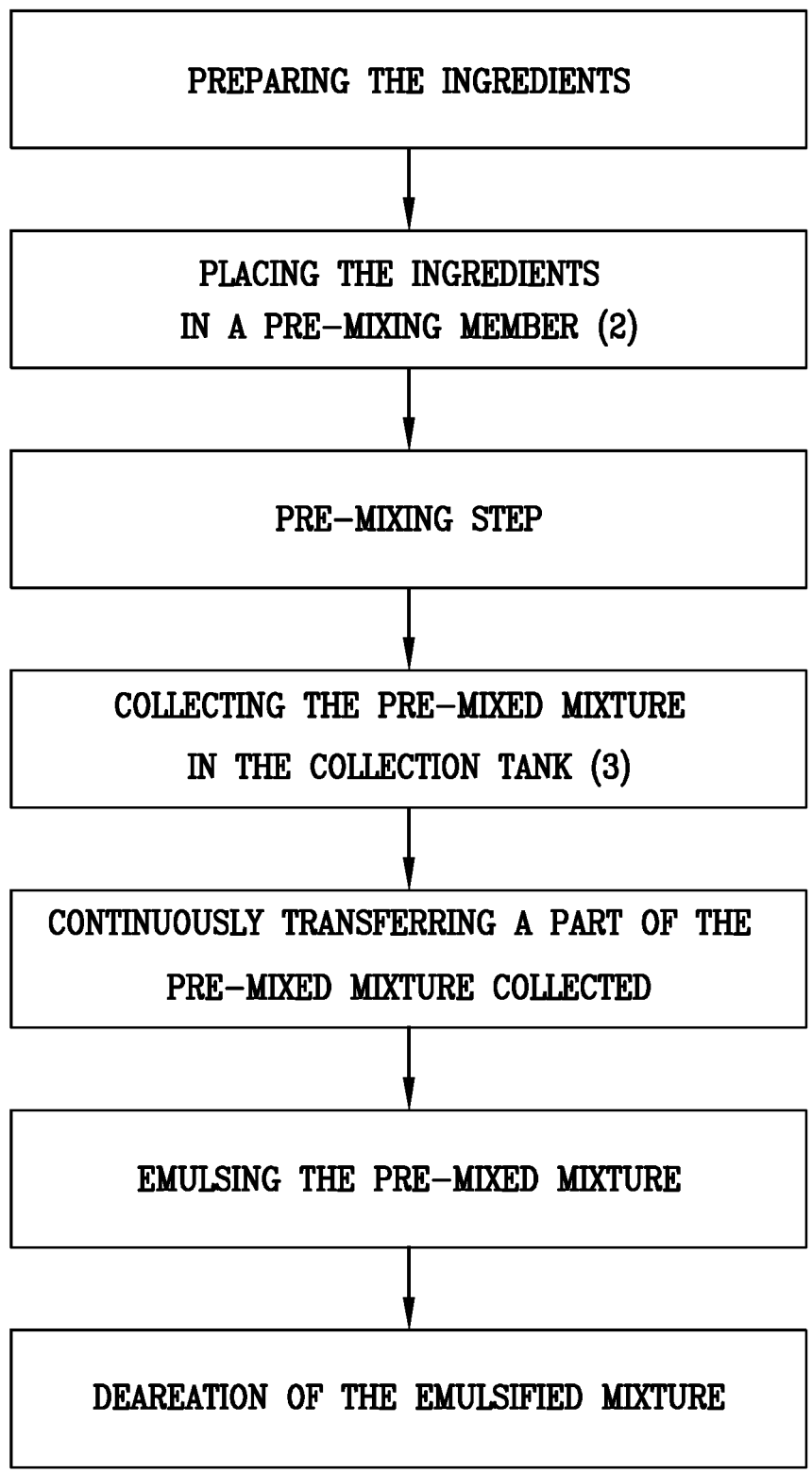
FIG. 1 illustrates a flow diagram which depicts the main steps of a process for preparing the soft cheesecake mixture.

FIG. 1 shows, according to a preferred aspect of the invention, the sequence of operating steps that define a process for preparing a soft cheesecake mixture.

In particular, the process comprises the following steps:
placing the ingredients for preparing the soft mixture in a pre-mixing member 2;
carrying out a step of pre-mixing the aforesaid ingredients so as to blend them together to obtain a pre-mixed mixture having a density comprised between 0.72 g/mL and 0.84 g/mL,
transferring the pre-mixed mixture into a collection tank 3 whose temperature is maintained at a value comprised between 25° C. and 40° C., preferably between 27° C. and 32° C.;
continuously transferring a part of the pre-mixed mixture present in the collection tank 3 towards a homogenising member 5;
carrying out a step of homogenising the pre-mixed mixture by means of the homogenising member 5 wherein the temperature is maintained at a value comprised between 25° C. and 40° C., preferably between 27° C. and 32° C., so as to obtain an emulsified mixture having a density comprised between 0.81 g/mL and 0.92 g/mL. In particular, the homogenising member 5 comprises an outer casing 6 which surrounds a mixing chamber 7 which extends along a longitudinal axis X and, furthermore, comprises at least one processing portion 8. The homogenising member 5 also comprises a rotor 9 arranged inside the processing portion 8 of the mixing chamber 7 and a stator 10 solidly constrained to the outer casing 6 and having an annular conformation about the longitudinal axis X so as to encircle the rotor 9 in a radially external position thereto at least at the processing portion 8 of the mixing chamber 7.

In other words, the process described envisages preparing the soft cheesecake mixture by implementing a substantially continuous production process, unlike the "batch" type process of the prior art.

More precisely, the process envisages collecting a first amount of pre-mixed mixture inside a collection tank 3, preferably for a value equal to about 60% of the total capacity of the collection volume W. Subsequently, the pre-mixed mixture contained in the collection tank 3 is gradually transferred continuously towards the homogenising member 5 for preparing the emulsified mixture having a density comprised between 0.81 g/mL and 0.92 g/mL.

Therefore, advantageously, the collection tank 3 enables to define a "production lung" able to guarantee the conveying of the pre-mixed mixture also if it is necessary to activate unexpected downtime in relation to the pre-mixing member 2, e.g. for performing unscheduled extraordinary maintenance.

Usually, some of the ingredients of the soft cheesecake mixture are: cream cheese, cream, skimmed milk powder, eggs, vanilla, sugar, flour and any other various food additives, e.g. xanthan gum.

According to one aspect of the invention, the ingredients are arranged in the pre-mixing member 2 at their storage temperature less than 10° C.

More precisely, the ingredients must not be tempered before their pre-mixing so as to maintain the cold chain of the ingredients and, therefore, to work with higher food safety standards. Therefore, for example, in the pre-mixing member 2 some ingredients can be advantageously placed in the pre-mixing member 2 directly at their storage temperature, e.g. equal to about 6.7° C. for the cream cheese, or equal to about 4.7° C. for the eggs and/or cream.

Preferably, the pre-mixing step comprises two distinct pre-mixing sub-steps. A first pre-mixing sub-step has a lower mixing frequency than the mixing frequency of a second pre-mixing sub-step following the first pre-mixing sub-step.

In this way, the first pre-mixing sub-step takes place at relatively low speeds which enable a more controlled mixing for blending all the ingredients together and, for example, preventing the more powdery ingredients from being suspended in the air rather than being incorporated into the mixture.

Therefore, the second pre-mixing sub-step (having a time duration less than 10 minutes), which is more energetic than the first as it is performed at higher speeds, enables a more homogeneous pre-mixed mixture to be obtained and having a density comprised between 0.72 g/mL and 0.84 g/mL.

Even more preferably, the pre-mixing step is carried out for an interval of time comprised between 10 minutes and 15 minutes, preferably 12 minutes.

In particular, the first pre-mixing sub-step has a time duration of less than 5 minutes, whereas the second pre-mixing sub-step has a time duration of less than 10 minutes.

According to one aspect of the invention, the pre-mixing member 2 is configured to maintain its temperature at a value comprised between 25° C. and 40° C., preferably between 32° C. and 37° C.

In this way, the pre-mixing member 2 is advantageously able to optimise the step of pre-mixing the ingredients of the soft cheesecake mixture.

According to another aspect of the invention, the collection tank 3 comprises at least one scraper blade 13 configured to maintain the pre-mixed mixture not yet conveyed towards said homogenising member 5 under constant mixing.

In this way, the process envisages maintaining the pre-mixed mixture at the right consistency and, at the same time, preventing any adhesion being created with the inner walls of the collection tank 3.

Additionally, the scraper blade 13 enables the pre-mixed mixture to be kept moving to promote the flow towards the bottom of the collection tank 3 in which there is the opening for transferring it towards the homogenising member 5 by the mixing pump 4.

Additionally, maintaining a temperature inside the collection tank at values comprised between 25° C. and 40° C., preferably between 27° C. and 32° C., even more preferably equal to about 30° C., enables the pre-mixed mixture to be maintained at a temperature such as to reduce the viscosity thereof and, at the same time, so as to prevent the adhesion with the walls of the collection tank 3.

According to a preferred aspect of the invention, each of the steps of the process previously described takes place in a controlled temperature environment isolated from an external volume.

In this way, the mixture never comes into contact with any contaminating agents that may be present in the external volume. Therefore, the process is advantageously able to guarantee high food safety standards. Additionally, taking place in a controlled environment, the process can be carried out continuously for very long periods of time, also for many consecutive days, without the need to be interrupted for being able to carry out the steps of cleaning and sanitising the members used. In fact, any plant cleaning operations must only be carried out when the production is stopped and, therefore, the external volume could enter into communication with the volume inside the plant, in which the mixture being processed is contained.

For example, the plant is configured to work continuously for six days, 24 hours a day, without any interruptions for maintaining constant production. Subsequently, on the seventh day, when the production is interrupted, it is necessary to carry out a cleaning operation, also due to the fact that the volume inside the plant may have come into contact with possible pollutants present in the volume outside the plant itself.

According to one aspect of the invention, the process comprises the further step of transferring the emulsified mixture towards a deaerator member 11 configured to further reduce any air incorporated during the homogenisation step so as to obtain a mixture having a density comprised between 0.90 g/mL and 0.97 g/mL.

According to another aspect of the invention, the deaerator member 11 comprises a ramp 12 configured to produce a cascade of emulsified mixture by gravity so as to enable the formation of a layer of emulsified mixture having a thickness comprised between 1 cm and 3 cm.

In this way, the process is advantageously able to remove any quantities of air incorporated during the homogenising step. The emulsified mixture, being distributed equally on the surface of the ramp 12, reduces its thickness to a value less than 3 centimetres so as to bring any air bubbles present to a surface portion of the emulsified mixture and, therefore, so as to enable the breaking of the surface tension that would normally keep them inside.

According to a further aspect of the invention, the deaerator member 11 is configured to maintain its temperature at a value comprised between 35° C. and 50° C., preferably between 42° C. and 47° C.

In this way, the deaeration of the emulsified mixture is promoted by breaking the surface tension of the air bubbles. More precisely, the solubility of the gases tends to diminish with the temperature, as described by the Le Chatelier chemical/physical principle.

Preferably, also the step of deaerating the emulsified mixture takes place in a controlled temperature environment isolated from an external volume so as to obtain the same advantages previously described.

According to a preferred aspect of the invention, the process envisages taking less than 5 minutes for carrying out all the steps subsequent to the pre-mixing, i.e. the mixture takes less than 5 minutes to be transferred to the homogenising member 5 and, if present, towards the deaerating member 11, through the collection tank 3 and the mixing pump 4.

Figure 2:
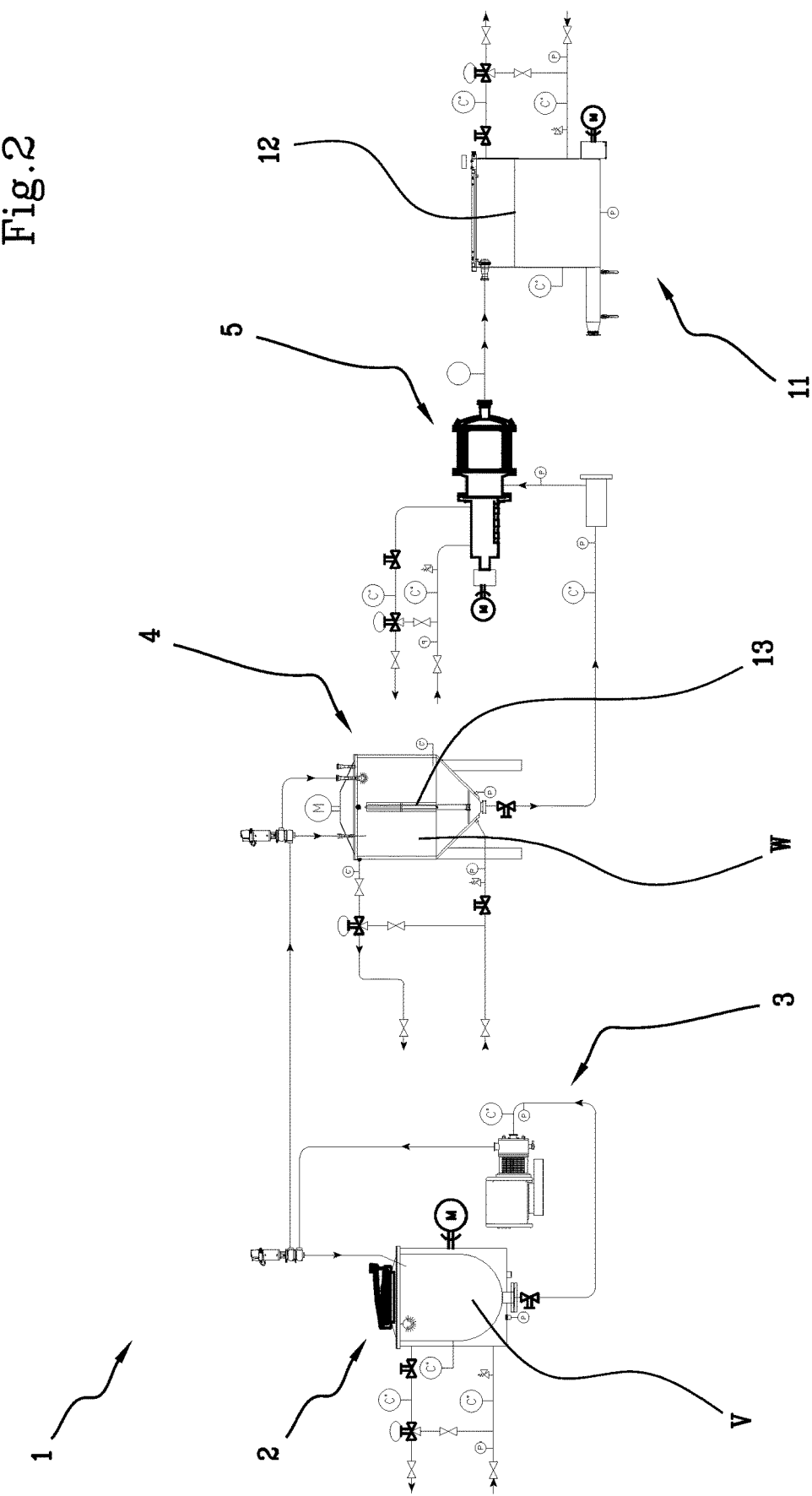
FIG. 2 illustrates a perspective view of a plant for the production of a soft cheesecake mixture.

FIG. 2 illustrates a schematic view of a production plant 1 for producing the soft cheesecake mixture.

In particular, the plant 1 comprises a pre-mixing member 2 having a containment volume V for containing the useful ingredients for preparing the soft mixture whose temperature is maintained at a value comprised between 25° C. and 40° C., preferably between 32° C. and 37° C. In particular, the pre-mixing member 2 is configured to pre-mix the ingredients so as to obtain a substantially homogeneous pre-mixed mixture.

The plant 1 also comprises a collection tank 3 having a collection volume W for receiving the pre-mixed mixture, wherein the temperature is maintained at a value comprised between 25° C. and 40° C., preferably between 27° C. and 32° C. In particular, the collection tank 3 is arranged downstream of the pre-mixing member 2.

Preferably, a mixing pump 4 is interposed between the pre-mixing member 2 and the collection tank 3 and, furthermore, is configured to transfer the pre-mixed mixture from the containment volume V to the collection volume W.

Figure 3:
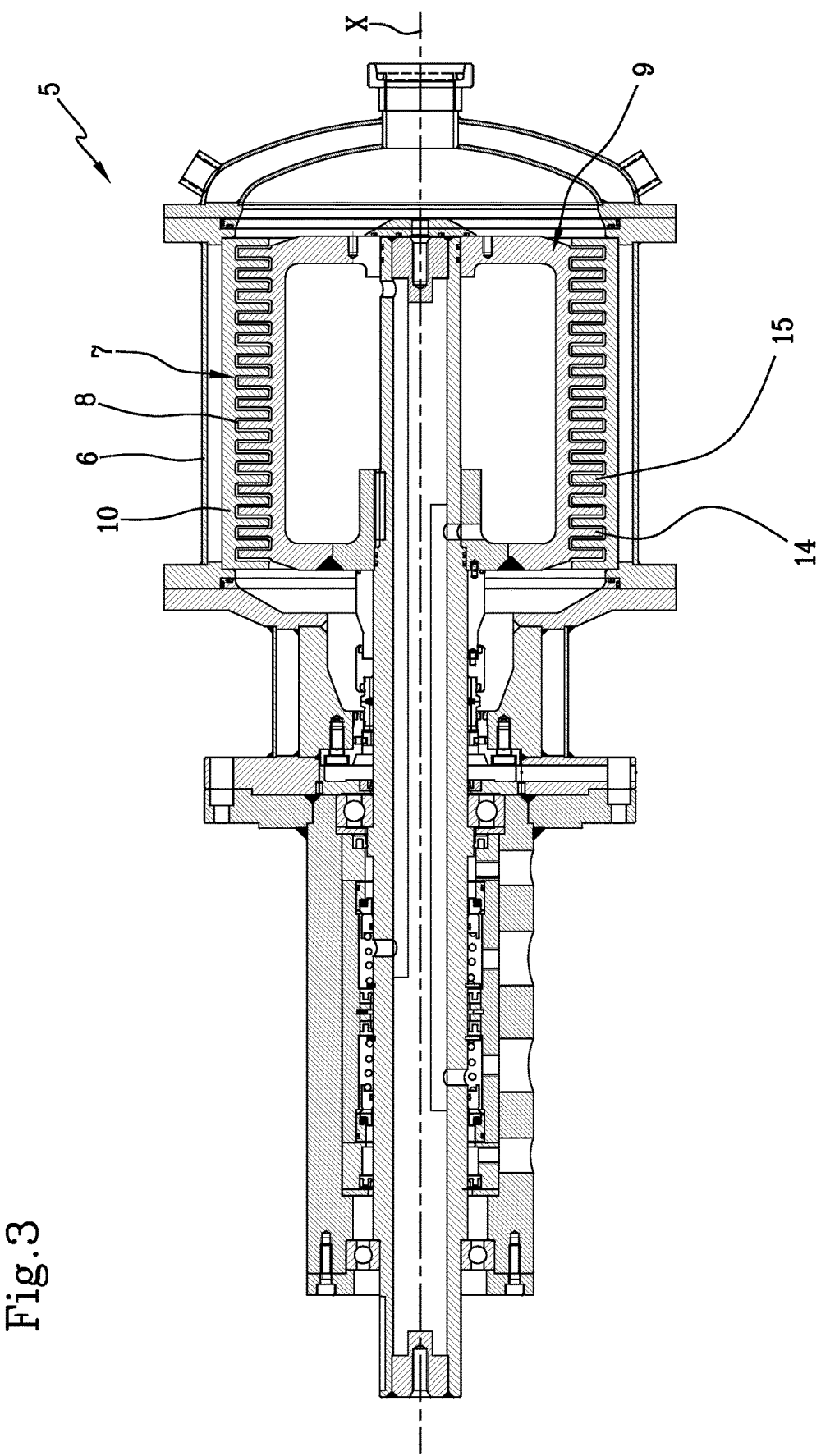
FIG. 3 illustrates a lateral view of the homogenising member illustrated in FIG. 2.

The plant 1, further, comprises a homogenising member 5, which in technical jargon is also called a turbo-mix member, which is better illustrated in FIG. 3. In particular, the homogenising member 5 is disposed downstream of the collection tank 3 and is configured to emulsify the pre-mixed mixture to a density value comprised between 0.81 g/mL and 0.92 g/mL. Preferably, the homogenising member 5 comprises an outer casing 6 which surrounds a mixing chamber 7 which extends along a longitudinal axis X and, furthermore, comprises at least one processing portion 8 wherein the temperature is maintained at a value comprised between 25° C. and 40° C., preferably between 27° C. and 32° C. The homogenising member 5 also comprises a rotor 9 arranged inside the processing portion 8 of the mixing chamber 7 and a stator 10 solidly constrained to the outer casing 6 and, furthermore, preferably having an annular conformation about the longitudinal axis X and encircling the rotor 9 itself in a radially external position thereto at least at the processing portion 8 of the mixing chamber 7.

In particular, the rotor 9 and the stator 10 comprise a plurality of projecting elements, respectively rotor elements 14 and stator elements 15, which extend along a radial direction to the longitudinal axis X. Advantageously the rotor elements 14 and the stator elements 15 are arranged alternately with one another so that they do not crash into one another during the rotation of the rotor 9 about the longitudinal axis X. Consequently, the homogenising member 5 is able to perform the step of homogenising the pre-mixed mixture as the latter is conveyed into the free spaces present between the rotor elements 14 and the stator elements 15. The rotation of the rotor 9 takes place at high speed, generally in the range of 70-80 rpm, so as to enable the optimisation of the mixing of the mixture.

More precisely, the rotor elements 14 and the stator elements 15 have a similar conformation to blades which, with respect to the main body of the rotor 9 and of the stator 10, extend along a radial direction to the longitudinal axis X of the homogenising member 5.

The rotor blades (and likewise the stator blades) are arranged aligned and distanced from one another along the longitudinal axis X so as to define recesses also extending along the same radial direction to the longitudinal axis X.

Preferably, the rotor blades and the stator blades are arranged alternately with one another along the extension direction of the longitudinal axis X so that, during the rotation of the rotor 9, each rotor blade (and likewise each stator blade) can pass through a respective recess defined between two stator blades (and likewise between two rotor blades).

Advantageously, as can be seen in FIG. 3, the recesses are slightly oversized with respect to the dimensions of the rotor and/or stator blades, generally by a few millimetres, so that the alternation between the rotor and stator blades themselves defines a feed path for the mixture. In other words, thanks to the high speed rotation of the rotor 9 about the longitudinal axis X, the mixture is moved from an inlet opening of the homogenising member 5 to an outlet opening thereof, along the aforesaid feed path which has a serpentine or zig-zag configuration. This high speed movement of the rotor 9 with respect to the stator 10, together with the little free space comprised between the rotor and stator blades (i.e. the low thickness of the feed path), optimises the homogenising process undergone by the mixture which, therefore, reaches a density comprised between 0.81 g/mL and 0.92 g/mL.

According to one aspect of the invention, each of the members 2, 3, 4, 5 of the plant 1 is configured to define at least its own controlled temperature environment, in which the mixture being processed is contained, and isolated from an external volume.

In other words, each member of the plant 1 is able to maintain the mixture being processed isolated from the external volume so as to prevent any contamination or oxidation of some ingredients.

Preferably, the entire plant 1 is configured to define only one controlled temperature environment isolated from the external volume. In other words, the passage of the mixture being processed from the pre-mixing member 2 to the homogenising member 5 takes place in an environment isolated from the external volume.

According to another aspect of the invention, the plant 1 comprises a deaerator member 11 disposed downstream of the homogenising member 5 and configured to obtain a mixture having a density comprised between 0.90 g/mL and 0.97 g/mL.

According to a possible aspect of the invention, the deaerator member 11 is configured to define at least its own controlled temperature environment, in which the mixture being processed is contained, and isolated from an external volume.

Preferably, the deaerator member 11 comprises a ramp 12 configured to produce a cascade of emulsified mixture by gravity so as to enable the formation of a layer of emulsified mixture having a thickness comprised between 1 cm and 3 cm.

In other words, the emulsified mixture when transferred from the homogenising member 5 to the deaerator member 11 tends to expand across the entire surface of the ramp 12 so as to define a layer of emulsified mixture sufficiently fine to enable any amounts of air incorporated during the homogenisation step performed by the homogenising member 5 to be released.

In fact, the relatively reduced thickness of the emulsified mixture arranged on the ramp 12 (variable between 1 centimetre and 3 centimetres) is advantageously able to enable the easy release of any air bubbles present. In fact, such reduced thickness enables any air bubbles to be arranged in a more superficial area of the mixture so that their surface tension breaks more easily.

Even more preferably, the deaerator member 11 is configured to maintain its temperature at a value comprised between 35° C. and 50° C., preferably between 42° C. and 47° C.

In particular, the ramp 12 is preferably made of heat conducting material, e.g. stainless steel, and is configured to have a temperature comprised between 35° C. and 50° C., preferably between 42° C. and 47° C., useful for promoting the breakage of the surface tension of the air bubbles contained in the emulsified mixture and, therefore, their release for the purpose of increasing the density of the mixture itself.

According to one aspect of the invention, the collection tank 3 comprises at least one scraper blade 13 configured to maintain the pre-mixed mixture not yet conveyed towards said homogenising member 5 under constant mixing.

In this way, the scraper blade 13 is able to prevent the mixture from sticking to the internal walls of the collection tanks 3 and, at the same time, promote the flow of the mixture being processed towards the bottom of the collection tank 3 itself for its correct transfer towards the homogenising member 5 through the mixing pump 4. According to one aspect of the invention, the pre-mixing member 2 comprises a motor configured to vary the mixing speed at least between a reduced-power configuration (the first pre-mixing sub-step of the process previously described), in which the mixing frequency is comprised between 20% and 60% of a maximum value, and a high-power configuration (the second pre-mixing sub-step of the process previously described), in which the mixing frequency is comprised between 60% and 90% of a maximum value.

According to one aspect of the invention, the plant 1 comprises a respective external heat exchanger associated with the pre-mixing member 2, the collection tank 3 and the homogenising member 5.

Preferably, each heat exchanger member comprises a serpentine coil connected to a refrigerator element or a heating element configured, respectively, to lower and raise the temperature of a heat exchange fluid which flows through the serpentine coil itself.

In this way, therefore, each heat exchanger is advantageously able to lower and raise the temperature of the respective member of the plant 1 with which it is associated, between a respective minimum and maximum value, so as to maintain the mixture being processed at a substantially constant temperature (there may be temperature fluctuations of about 2° C.) so that the production is constant and the density of the mixture optimised.

Even more preferably, the pre-mixing member 2 and/or the collection tank 3 and/or the homogenising member 5 comprise a respective gap comprising at least one internal partition wall (coinciding with the casing of the homogenising member 5) in direct contact with the mixture being processed and an external partition wall facing the external volume of the plant 1 and, furthermore, distanced from the internal wall so as to form an intermediate volume for the heat exchanger.

Advantageously, each heat exchanger is connected to the respective gap so that the heat exchanger fluid flows through the latter and the related intermediate volume for maintaining the temperature of the related member of the plant 1 within the respective temperature interval previously described.

In other words, each heat exchanger is configured to carry out the heat exchange with the gap of the respective member of the plant 1 so as to maintain the temperature of the mixture substantially constant during processing through direct contact between the internal partition wall of the gap and the mixture being processed itself.

Advantageously, each heat exchanger is configured to directly control the temperature of the fluid inside the gap (through appropriate sensors/detection probes) so as to have indirect temperature control also inside the homogenising member 5.

The invention claimed is:

1. A process for preparing a soft cheesecake mixture, comprising the following steps:
    placing the ingredients for preparing the soft mixture in a pre-mixing member;
    pre-mixing the aforesaid ingredients in the pre-mixing member so as to blend them together to obtain a pre-mixed mixture having a density comprised between 0.72 g/mL and 0.84 g/mL;
    transferring the pre-mixed mixture into a collection tank whose temperature is maintained at a value comprised between 25° C. and 40° C.;
    continuously transferring a part of the pre-mixed mixture present in the collection tank towards a homogenizing member as part of a continuous production process;
    homogenizing the pre-mixed mixture by means of said homogenizing member, whose temperature is maintained at a value comprised between 25° C. and 40° C. so as to obtain an emulsified mixture having a density comprised between 0.81 g/mL and 0.92 g/mL; and
    transferring the emulsified mixture towards a deaerator member configured to further reduce any air incorporated during the homogenization step so as to obtain a mixture having a density comprised between 0.90 g/mL and 0.97 g/mL;
    wherein said homogenizing member comprising a rotor rotating relative to a stator, between which there is defined a mixing chamber that extends along a longitudinal axis configured in such a way as to create a feed path of the pre-mixed mixture that has a serpentine or zig-zag configuration along which the continuous mixing of the pre-mixed mixture conveyed from the collection tank takes place, the pre-mixed mixture contained in the collection tank being gradually transferred continuously towards the homogenizing member for preparing the emulsified mixture having a density between 0.81 g/mL and 0.92 g/mL; and
    wherein each of the steps are realized as part of the continuous production process.

2. The process according to claim 1, wherein the ingredients are placed in said pre-mixing member at their storage temperature of less than 10° C.

3. The process according to claim 1, wherein said pre-mixing comprises two distinct pre-mixing sub-steps; a first pre-mixing sub-step has a lower mixing frequency than a second pre-mixing sub-step following the first pre-mixing sub-step.

4. The process according to claim 1, wherein said pre-mixing is carried out for an interval of time comprised between 10 minutes and 15 minutes.

5. The process according to claim 1, wherein said pre-mixing member is configured to maintain its temperature at a value comprised between 25° C. and 40° C.

6. The process according to claim 1, wherein said collection tank comprises at least one scraper blade configured to maintain the pre-mixed mixture not yet conveyed towards said homogenizing member under constant mixing.

7. The process according to claim 1, wherein the soft cheesecake mixture is prepared in a controlled-temperature environment isolated from an external volume.

8. The process according to claim 1, wherein said deaerator member comprises a ramp configured to produce a cascade of emulsified mixture by gravity so as to enable the formation of a layer of emulsified mixture having a thickness comprised between 1 cm and 3 cm.

9. The process according to claim 1, wherein said deaerator member is configured to maintain its temperature at a value comprised between 35° C. and 50° C.

* * * * *